United States Patent [19]

Mitchell et al.

[11] Patent Number: 5,510,123
[45] Date of Patent: Apr. 23, 1996

[54] FOOD SWEETENER COMPOSITION AND PROCESS

[75] Inventors: Cheryl R. Mitchell, Stockton, Calif.; Morris A. Mann, Phoenix, Ariz.

[73] Assignee: California Natural Products, Lathrop, Calif.

[21] Appl. No.: 167,515

[22] Filed: Dec. 14, 1993

[51] Int. Cl.$^6$ ........................................ A23L 1/236
[52] U.S. Cl. ........................ 426/3; 426/590; 426/660; 426/579; 426/548
[58] Field of Search ........................ 426/548, 658, 426/577, 804, 590, 3, 579

[56] References Cited

U.S. PATENT DOCUMENTS

| | | | |
|---|---|---|---|
| 3,743,518 | 7/1973 | Eisenstadt et al. | 99/141 |
| 4,681,771 | 7/1987 | Adachi et al. | 426/658 |
| 4,690,827 | 9/1987 | Kupper et al. | 426/548 |
| 4,772,482 | 9/1988 | Olinger et al. | 426/548 |
| 5,008,254 | 4/1991 | Weibel | 426/804 |

*Primary Examiner*—Jeanette Hunter
*Attorney, Agent, or Firm*—Albert C. Smith

[57] ABSTRACT

Food sweetener compositions containing aspartame and sugar acids. Specifically, the sweetener compositions include a sugar acid, such as a polyuronic acid, in an amount sufficient to eradicate the undesired lingering aftertaste of aspartame without contributing to viscosity or pulp volume. The present invention also involves the novel use of such sweetener compositions in food products, such as carbonated beverages, so that they no longer exhibit the lingering aftertaste of aspartame.

20 Claims, No Drawings

FOOD SWEETENER COMPOSITION AND PROCESS

BACKGROUND OF THE INVENTION

1. Field of the Invention

The present invention relates generally to the field of food sweetener compositions, and relates specifically to the field of food sweetener compositions including aspartame as a component.

2. Description of Background Art

Aspartame is a non-nutritive sweetener that is 160 times sweeter than sucrose in aqueous systems. Because of its sweetness intensity, it is utilized in beverage systems at levels of between 5 mg percent and 200 mg percent by weight as a replacement for sucrose or other nutritive carbohydrates to produce a "low sugars" or "low-calorie" product. Almost three-fourths of all aspartame sales are made to the diet beverage industry.

The diet beverage industry, and more specifically the carbonated diet beverage industry, has preferentially utilized aspartame as the non-nutritive artificial sweetener. One drawback of aspartame is that many people detect a lingering aftertaste, frequently described as "metallic" or "bitter". Those people who detect an aftertaste with aspartame, and who currently do not consume the beverage because of the aftertaste, represent a substantial market. A low calorie product that does not possess the negative aftertastes perceived with aspartame potentially could gain a significant market share.

Chemical substances that diminish or eradicate the lingering aftertaste caused by aspartame, may be considered a food additive and therefore require FDA approval. Thus, compounds that already are considered GRAS (Generally Regarded As Safe) or are already approved by the FDA as a food additive, are preferable over those substances that must still go through the FDA review process.

Since the introduction of aspartame, many researchers have attempted to reduce the aftertaste using a variety of substances with limited success. One example is described in U.S. Pat. No. 4,690,827 to Kupper, et al. That patent discloses a process for increasing pulp volume (pulp composed of either homogenized fruit pulp, cellulose, or a cellulose/pectin material) in artificially sweetened beverages containing fruit juices. It was found that the increased pulp volume of reduced size apparently decreases the aftertaste of non-nutritional sweeteners, including aspartame, saccharine and cyclamate. The mechanism by which the aftertaste of these artificial sweeteners was diminished was not discussed other than the importance of increased pulp volume and decreased fruit pulp particle size. The increased pulp volume apparently had the same effect on all different types of artificial sweetener.

These remains a need for a sweetener composition that eradicates the lingering aftertaste associated with aspartame. Particularly, there is a need for GRAS compounds that may be used in food products containing aspartame.

SUMMARY OF THE INVENTION

The present invention involves novel food sweetener compositions containing aspartame and sugar acids. Specifically, the novel sweetener compositions include a sugar acid, such as a polyuronic acid, in an amount sufficient to eradicate the undesired lingering aftertaste of aspartame without necessarily contributing to pulp volume. The present invention also involves the novel use of these sweetener compositions which are comprised of aspartame and sugar acid in food products so that they no longer exhibit the lingering aftertaste of aspartame.

Sugar acids that may be used in forming the inventive food sweetener composition include those sugar acids having a free C1 or C6 carboxylic acid group, such as aldonic, uronic, polyuronic, aldaric, partially esterified polyuronic, and partially esterified aldaric acids. The sugar acids may be derived from a variety of sources, including pectins, algins, synthetic polymers of uronic acids (including those polymers which are partially esterified), and oxidation of an appropriate sugar source such as monosaccharides or polymers of monosaccharides. These acids can effectively be utilized at concentrations of between about 1 mg percent and about 250 mg percent in aqueous beverage or food systems containing 5 to 200 mg percent aspartame, to achieve a sweet tasting product having none of the lingering aftertaste of aspartame.

The ratio of sugar acid to aspartame in the inventive food sweetener composition and food compositions, is dependent on the type and/or source of the sugar acid, as well as the composition of the food. Other constituents of the food such as, but not limited to, flavors, proteins, fats, and carbohydrates may function to mask the effect of the sugar acid and therefore a greater percentage of sugar acid is required. The source of sugar acid, and in the case of the polyuronic acids, the processing conditions to which these acids are subjected to, is also critical in determining the ratio of sugar acid to aspartame in either a sweetener or food composition. The novel discovery that processed or treated polyuronic acids are considerably more effective on a weight per weight basis, in eradicating the lingering aftertaste of aspartame than their untreated or natural counterparts, is revealed. Novel processes for manufacturing these "treated" and more effective polyuronic acids by thermal and/or enzyme methods are described.

In one embodiment of the present invention, the food sweetener composition includes aspartame and sugar acids such that the relative concentration of sugar acid in an aqueous solution is 2 to 120 percent that of aspartame on a weight to weight solids basis. A more preferable range depends upon the type of sugar acid used. For example, gluconic is about 30%, while other monomeric acids, pectic acid and "treated" pectinic acids are about 15 to 55%. Alginic acids are effective at very low levels of about 2%. Commercially available citrus pectins are about 120%. Pectins from other sources such as apple (which have a lower average molecular weight) are utilized in the range of about 100% to about 120% depending upon the source and preparation.

The present invention also is directed to exogenous sugar acids which are added in an amount sufficient to eradicate the lingering aftertaste of food products containing aspartame. The food product compositions may be carbonated or non-carbonated beverages, dairy or dairy-alternative based foods, gelatins, or any other sweetened food product that include aspartame as a sweetener.

DESCRIPTION OF THE PREFERRED EMBODIMENTS

The term eradicate, as used in this application, refers to the absence of the aftertaste of aspartame. This aftertaste, which is characterized as a sweet, bitter, and/or metallic flavor, continues or lingers for a period of time in excess of five seconds after the food composition containing the aspartame has exited the oral cavity.

Many chemical substances have been tested in conjunction with aspartame to determine whether these substances reduce (and more desirably, eradicate) the lingering aftertaste of aspartame detected by some people. A variety of different food ingredients having a carboxylic acid functional group such as lactic, acetic, succinic, tartaric and malic acid were tested and found to be ineffective. However, a surprising result, described in further detail below, is found using sugar acids. Unlike other weak organic acids having a free carboxylic acid group the sugar acids are surprisingly effective in reducing and eradicating the lingering aftertaste caused by an aqueous aspartame solution. Interestingly enough, the sugar acids were not found to be effective in reducing the aftertaste associated with other non-nutritional sweeteners, specifically saccharine or cyclamate.

In general, the present invention involves compounds belonging to the general category of sugar acids, including aldonic, uronic, polyuronic, and aldaric, which have the effect of diminishing and eradicating the lingering and metallic aftertaste caused by aspartame. The compounds of the present invention are based on the aldohexoses (monosaccharide) having a carboxylic acid group at the aldehydic carbon, (C-1), the primary hydroxyl carbon group (C-6), or at both positions. Such compounds are discovered to have the ability to eradicate the lingering aftertaste of aspartame. The compounds in the above categories which are commonly available are shown in the following Table 1:

TABLE I

| Commonly Available Sugar Acids and Location of the Effective Carboxyic Acid Group | | | |
|---|---|---|---|
| aldonic C-1 | uronic C-6 | polyuronic C-6 | aldaric C-1 and C-6 |
| gluconic | glucuronic galacturonic mannuronic | pectinic, pectic acids alginic acid | glucaric (saccharic) galactaric |

While the above sugar acids are available, each particular sugar acid may not be suited for use in all food and beverage systems containing aspartame due to inherent physical properties. For example, the aldaric acids exist commercially as the salts and are insoluble and ineffective as such. Polygalacturonic acid (pectic acid) and alginic acid are relatively insoluble in water. Mannuronic acid is insoluble at pH less than 3. Therefore, use of these acids in clarified beverages due to precipitation would be unacceptable, whereas the use of these acids in certain food compositions such as puddings, is acceptable. Hydrolysis or synthesis of polymers of the sugar acids so as to produce shorter polymer chains which might have improved solubility is possible and a consideration, but the relative cost, technology, and unavailability make this alternative impractical at the present time.

Another physical property of sugar acids that may be considered undesirable in food systems and which is characteristic of polyuronic acids that are pectins, is the mucilaginous or viscosity building characteristics at concentrations of greater than 100 mg percent by weight. In carbonated beverages, such an increase in viscosity, pulp volume, and mucilaginous property would be undesirable. Thus, selection of an appropriate sugar acid depends on the food or beverage product with which the sugar acid is being used.

The monomeric sugar acids gluconic, glucuronic, and galacturonic, are the most commonly available. Unfortunately, at the present time, these acids would require FDA approval for use as food additives. We were able to successfully utilize these monomeric sugar acids at levels of about 15–30 mg % in aqueous solutions containing 100 mg % aspartame. As used herein, mg percent is defined as mg per 100 cc. At such concentrations, these sugar acids have the desired affect on eradicating the lingering aspartame aftertaste. However, it was noticed that at the concentration necessary to eradicate the lingering aftertaste, the monomeric sugar acids, at least in aqueous systems, started to contribute an undesirable sharp acid aftertaste of their own.

Alginic acid we found to be quite effective in eradicating the lingering aftertaste of aspartame requiring less than 3 mg % in an aqueous solution containing 100 mg % aspartame. However, the alginic acid was not soluble and existed as a suspension. The use of alginic acid in puddings tended to strongly potentiate and alter the flavorings commonly used in puddings. It is possible, of course, that other more suitable flavors may be found. At the current time, according to the U.S. Codes of Federal Regulation, Title 21, alginic acid is suitable for use only in soups or soup bases.

We found that pectin also has the ability to eradicate the aftertaste of aspartame. However, it was found that commercial pectins are considerably less effective than the monomeric sugar acids, requiring 120 mg % as compared to 15 mg %, respectively, in an aqueous solution containing 100 mg % of aspartame. To our surprise, we discovered that this same pectin subjected to thermal treatment, according to the processes described in further detail below, produced a "treated" pectinic acid, which may be termed as a pectin syrup, that was equally as effective (requiring the same concentration) as the monomeric sugar acids. Unexpectedly, it was found that the concentration of monomeric sugar acid (galacturonic acid) in these treated pectins was only about 0.2 to 5 percent. It is obvious, that we discovered that the pectinic acids resulting from the described thermal and/or enzymatic processes, are as effective as the monomeric acids in eradicating the lingering aftertaste of aspartame. However, unlike the monomeric sugar acids, it was found that these treated pectinic acids at the levels necessary to eradicate the lingering aftertaste, do not posses a sharp acid after-taste as do the monomeric acids. These treated pectinic acids were used advantageously over commercially available pectins in all food and beverage formulations requiring clarity and no contribution to viscosity or pulp volume.

A comparative taste evaluation of sugar acids was performed and the results of that evaluation are shown below in Table 2. For that study, an aqueous solution containing 100 mg % weight per weight aspartame was prepared and stored in the refrigerator for 48 hours before using. To 100 cc of this solution was added an amount of a sugar acid. The concentrations were varied by 1 to 5 mg increments and the resulting solutions evaluated by a panel of taste testers for the presence of a lingering aftertaste associated with aspartame, as well as any detectable off-flavors. The results summarized in Table 2 are the minimum quantity of sugar acid necessary to eradicate the lingering aftertaste of the aspartame. At the concentration found to eradicate the aftertaste, any off-tastes or other physical properties attributed to the sugar acid was noted.

TABLE 2

COMPARATIVE TASTE EVALUATION OF SUGAR ACIDS

| Sugar acid | Min. sugar acid dry basis found to eradicate lingering aftertaste | Off-flavors at the min. % sugar acid | Other properties at the min. % sugar acid |
| --- | --- | --- | --- |
| Gluconic | 30 mg % | sharp acid | none |
| Glucuronic | 15 mg % | sharp acid | none |
| Galacturonic | 15 mg % | sharp acid | none |
| Polygalacturonic acid | 15 mg % | none | insoluble |
| Pectin (HM) | 100–120 mg % | off-flavor | increased viscosity, cloudiness, and pulp volume |
| Alginic acid | 2 mg % | none | insoluble |
| Treated pectin | 15–55 mg % | none | none |

Relatively large quantities, greater than 100 mg %, of commercially available pectin, are required to eradicate the aftertaste of aspartame as compared with monomeric sugar acids. At the minimum concentration required for pectins, a distinct cloudiness or translucency, and contribution to the overall viscosity and pulp volume of the solution, is observed. These pectins, at the effective concentration, also tend to contribute a distinct flavor which may not be compatible in many applications. Consequently, we found the use of commercial pectins to be unsatisfactory in beverage systems requiring clarity or limited viscosities. High flavored beverage or food systems having a translucent or opaque character or containing or having the ability to sustain the increase in viscosity and pulp volume caused by the levels of pectin necessary to eradicate the aftertaste of the aspartame, may have success in its use. However, these latter applications are somewhat limited.

However, the use of treated pectins, as described in further detail below, are found to have no off-flavors and are soluble in a concentration of 15–55 mg %. The monomeric acids, while requiring a substantially lower concentration to eradicate the lingering aftertaste of aspartame, also produced a distinctive off-taste noted in the solution. The insolubility or inherent sharp acid flavor of some sugar acids make them undesirable for food product applications which require clarity or have a flavor profile which is incompatible with a sharp acid flavor. Consequently, selection of the appropriate sugar acid is dependent upon the nature of the food composition in which the sugar acid is to be used. The amount of sugar acid that is to be used in a food product application is dependent upon the sugar acid utilized and the nature of the other constituents in the food product which may interfere or possibly accentuate the effects of the sugar acid on the aspartame.

The relative amount of sugar acid concentration to aspartame concentration in a food sweetener composition is a function of the effectiveness of the sugar acid that is being used. It is recognized, that the ratio as determined simply in aqueous systems, provides a starting point of the relative amounts of sugar acids to aspartame that may be required. Understandably, an appropriate adjustment to this ratio can readily be made for more complex food systems which are comprised of any or all of the following: flavors, proteins, fats, and carbohydrates.

Appropriate sugar acids are readily added to food or beverage systems which already contain aspartame to eradicate the existing lingering aftertaste of aspartame. The choice of sugar acid is dependent on the food or beverage system, its clarity and pH, as well as the desirable or undesirable physical properties that may be contributed by the sugar acids.

Fruit and vegetable products that naturally contain endogenous pectin do not posses pectin in sufficient quantities to eradicate the lingering aftertaste of certain concentrations of aspartame that may be added. Examples of this are given in Table 3 below. Products were chosen that contain pectin endogenous to the fruit or vegetable and which were subjected to a moderate thermal and enzymatic treatment during the canning process. For this purpose, V-8 Vegetable drink and frozen orange juice were selected and evaluated. In Table 3, a designation of "−" indicates no lingering aftertaste is detected, and a designation of "+" indicates the presence of a lingering aftertaste.

TABLE 3

CONCENTRATION OF ASPARTAME VERSUS PRESENCE OF LINGERING AFTERTASTE IN FOOD PRODUCTS INHERENTLY CONTAINING PECTIN

| Concentration of aspartame added (mg percent) | V-8 Vegetable drink | Reconstituted frozen orange juice |
| --- | --- | --- |
| 5 | − | − |
| 15 | − | − |
| 20 | − | − |
| 25 | + | − |
| 30 | + | − |
| 35 | + | + |
| 50 | + | + |

The data shown above in Table 3 establishes a maximum level of aspartame that can be added to a product containing endogenous pectin without having to add any additional sugar acids to eradicate the lingering aftertaste associated with aspartame. At 100% juice, these beverages have sufficient pectin material to eradicate the lingering aftertaste of 25 mg % added aspartame for V-8 Vegetable Juice and 35 mg % added aspartame for reconstituted (single strength) orange juice. It is understood, that if these fruit juices were diluted with water such that the fruit or vegetable juice constituted a fraction of the resulting beverage, the addition of aspartame to achieve the desired sweetness, would require the addition of exogenous sugar acid. For example, if a beverage contained 10% orange juice, aspartame levels of greater than 3.5 mg % would require the use of exogenous sugar acids to eradicate the lingering aftertaste of aspartame; at 50% orange juice, aspartame levels greater than 17.5 mg % would require the use of exogenous sugar acids, and so on.

Treated Pectin Acids

As mentioned above, "treated" pectin, as a source of sugar acid, was found to have physical properties and effectiveness superior to those of other sugar acids. We will now describe these treated pectinic acids and processes by which they can be made.

Pectins.

Pectins may be dispersed in water using a high sheer mixer, such as a Waring type blender. Dispersions of 5 to 10% dry pectin to water are preferable. Lower than 5% are certainly possible but less economical. Dispersions of from 5 to 10% pectin, are best accomplished by elevating the water temperature to between 60° C. and 80° C. Dispersions greater than 10% due to their excessive viscosity, require an extremely high sheer force to disperse the pectin, and are very difficult to pump.

The present invention involves subjecting an aqueous dispersion of polyuronides, preferably pectin, obtained from natural sources to a novel thermal treatment described in detail below, whereby not only is the viscosity greatly reduced, but novelly, the resulting aqueous mixture containing the uronic acid and its polymers, actually separate upon cooling and standing into a clear supernatant solution and a precipitate that can be further separated by decantation, centrifugation or filtration. The precipitate being comprised of calcium pectate, protein and pentosans. The analysis and descriptions of aqueous pectin dispersions, treated and untreated are given in TABLE 4 below. The treated pectin dispersions being subjected to either thermal or enzymatic condition as defined.

High Pressure Ion Chromatography (HPIC) may be utilized to determine the size and amounts of galacturonic acid and its polymers. The Degree of Polymerization (DP) refers to the number of anhydrogalacturonic acid units in a given polymer. For example, galacturonic acid is referred to as DP1, whereas a polymer consisting of four anhydrogalacturonic acid units would be referred to as DP4. The HPIC analysis as described in detail below, is capable of quantitatively determining DP1 to DP20.

In a preferred embodiment, and as used in the examples provided below, the HPIC determinations are made using a DIONEX™ BIO-LC equipped with a Pulsed Amperometric Detector (PAD), a DIONEX Gradient Pump, and a Dionex Degas Module. A Spectra-Physics Integrator Model #4270 is utilized for integration purposes. The column is a Carbo-Pac I™. A 25 microliter injection loop is used. Helium is used as the inert gas chosen for the Degas Module and valve operation. Eluant A is a 0.1N sodium hydroxide solution. Eluant B is a 0.1N sodium hydroxide, 1.0N sodium acetate solution. The gradient is 0–30% Eluant B in 30 minutes. Under these conditions galacturonic acid has a retention time (RT) value of 12.2 minutes. The polymers between DP2 and DP30 appear as individual peaks having an RT between about 16.5 and 34.0.

The response factor for DP1 is determined using known quantitative amounts of DP1. Since the PAD operates under the premise of the Nernst equation, the electrical impulse response is dependent on molar values rather that percent gram weight, as in RI detectors. It therefore is assumed that the response value is a direct function of molecular weight and subsequently may be adjusted according for each polymer specie ($DP_N$) respective to the known response value for DP1. The area of a peak integrated divided by the calculated response factor, yields a corrected integrated value that may be used to determine a quantitative value for an individual peak. In this way, the relative composition of the polyuronic acid dispersions and mixtures are determined.

Thermal degradation of pectin as described in the literature, involved long periods of time (less than 24 hours) at temperatures below 100° C., to effectively reduce the viscosity of an aqueous pectin solution. We observed that a 5% aqueous pectin solution subjected to 24 hours at 100° C., resulted in a pectin dispersion having a reduced viscosity and having an appearance that was translucent and cloudy even after centrifugation for two minutes at a force 1380 times that of gravity. Comparing the analysis of a pectin dispersion with no thermal treatment with that of a dispersion subjected to 100° C. for 24 hours, indicates the primary difference is that of viscosity, which has been decreased. It is also notable that there is no apparent galacturonic acid (GA) and polymers of galacturonic acid in the detectable range of the HPIC. Clarity of the dispersion has not been improved and its effectiveness in eradicating the lingering aftertaste of aspartame only slightly increased, requiring a usage level of only about 100 mg % versus about 120 mg %.

We found that treatment of a 5% aqueous pectin dispersion at a temperature of 120° C. for 1 hour, produced a pectinic acid mixture containing insoluble compounds that separated upon cooling and standing, to form a clear supernatant (pectinic acid solution) and precipitate. This treated mixture may be effectively utilized as such. However, since clarity is desirable in many food applications, most notably beverages, it is preferable to remove the precipitate by decantation, centrifugation, and/or filtration. We found that, depending on temperature, in excess of 100° C., the time required for the aqueous pectin dispersion to convert into a mixture containing a solution and precipitate that separate upon cooling and standing, ranges from 1 to 6 hours. After removal of the precipitate, the thermally treated pectin solution may be described in terms of clarity, low viscosity, polydispersity, intensified acid flavor with little or no bitter notes, and superior effectiveness in eradicating the lingering aftertaste of aspartame. Excessive heat treatment, beyond that necessary to allow the dispersion to separate upon cooling and standing into a solution and precipitate, and allowing for the development of increased acid flavor, results in the development of bitter off-flavors.

It is preferable to obtain the maximum acid taste with the minimum of bitter flavor. The bitter flavor may described as being caramel or burnt in nature and eventually, if predominant bitter notes exist in the sugar acid, then, at the use level necessary to eradicate the lingering aftertaste of aspartame, becomes detectable in the food compositions. It is preferable to develop, by thermal treatment above 100° C., a clear solution which has maximum effectiveness requiring the least amount of treated pectinic acid as a percentage of aspartame), with the minimum amount of contributory off-taste that may be described as bitter, caramel, or burnt.

In Table 4, clarity of the pectinic acid solution described after the mixture has been centrifuged for two minutes at a force of 1380 G's followed by decantation to remove the precipitate. The data reported in Table 4 indicate that heating in excess of 100° C. causes significant changes to the pectin dispersion. After removal of the precipitate, clarity of the solution is profound and the viscosity is decreased to less than 100 cps. The titratable acidity was found to be about the same, indicating that little demethoxylation has occurred. The HPIC data indicate the increase in detectable polymers upon additional heat treatment in excess of 100° C.

We have found that high temperatures in excess of 100° C. promote the precipitation of calcium pectinates upon cooling and after separation, leaves a clear solution having a viscosity of less than 100 cps. This solution containing galacturonic acid and its detectable polymers of from DP2 through DP20 may then be further concentrated by the removal of water to a syrup of 5 to 80%, more preferably 20 to 60% solids basis, and/or dried preferably by spray drying or drum drying, to form a solid product.

We have further found that the GA monomer has about the same effectiveness as the polymers resulting from the thermal degradation of pectin on a weight for weight basis n eradicating the lingering aftertaste of aspartame. However, unlike the monomer, the thermally treated pectin of this invention, did not possess the sharp acid flavor that is inherent in the monomer acid. The pectinic acid polymer therefore, resulting from the described thermal treatment, was considered to be preferential over the monomer.

Pectin from different sources are known to have different molecular weights. We found that apple pectin for example, when subjected to the thermal process of this invention, produced a pectinic acid solution that was more effective than the thermally treated pectinic acid solution resulting from citrus pectin. Unfortunately, there were some other off-flavors associated with the apple pectin. The thermally treated apple pectins were found to have about the same levels of GA, but significantly greater levels of, polymers in the range of DP2 to DP20. The treated apple pectin was also found to have a considerable number of molecules, visible in the HPIC data but not identified, having a retention time below that GA. Some of the off-flavors detected were believed to be associated with these peaks.

A summary of the physical properties of aqueous pectin solutions are given in TABLE 4 below. The data demonstrates the changes in physical properties, and effectiveness of the pectin towards aspartame, upon thermal treatment as described in this application as compared with no treatment or conventional treatment as has been described in the literature.

TABLE 4

PROPERTIES OF 5% AQUEOUS PECTIN SOLUTIONS
(Treated and Untreated)

| Time hours | 0 | 24 | 5.5 | 0.3 | 3 |
|---|---|---|---|---|---|
| temp. °C. | 25 | 98 | 105 | 132 | 120 |
| treatment | none | none | TH | TH | TH |
| GA | 0 | 0 | 0.3 | 0.2 | 1.5 |
| DP 2-24 | 0 | 0 | 3.9 | 2.7 | 45.2 |
| pH | 3.6 | 3.2 | 3.2 | 3.2 | 3.2 |
| viscosity (cps)[6] | 11,600[1] | 3,430[2] | 35.5 | 15.0 | 7.0 |
| clarity | cloudy | cloudy | clear | clear | clear |
| mg % to eradicate aftertaste[7] | 120 | 100 | 55 | 55 | 30 |
| off-flavors[8] | yes | yes | none | none | none |

[1]Brookfield viscometer, 50 rpm, spindle #6, 24° C.
[2]Brookfield viscometer, 100 rpm, spindle #5, 24° C.
[3]Brookfield viscometer, 20 rpm, spindle #1, 20° C.
[4]100 cc of 100 mg % aspartame aqueous solution; mg percent sugar acid required to eradicate the lingering aftertaste of the aspartame.
[5]Observed in the sugar acid treated aspartame solution.

The following examples are illustrative of the following: food sweetener compositions containing sugar acids and aspartame; uses of these food sweetener compositions in food products; use of sugar acids in food products containing aspartame; and process for preparing treated pectinic acid solutions embodying the present invention. The following examples illustrate that different sugar acids may be used in various food sweetener compositions and food products. These examples also illustrate that the sugar acid or sweetener composition, may exist and be used in a syrup or a dried form, depending on the food product and convenience in formulations. The sugar acids may be obtained from commercially available methods or sources and used as such or by subjecting pectin to the thermal treatment as described in this application. These examples are not to be construed as limiting, but merely demonstrate exemplary processes, compositions, and uses in food products incorporating the present invention.

EXEMPLIFICATION

I. Food Sweetener Compositions

EXAMPLE 1

Dry Food Sweetener Composition
A. Add 15 grams of GA to 100 grams of aspartame. The two powders are blended thoroughly to yield a homogenous and uniform appearance. The final product being comprised of 13% GA and 87% aspartame on a dry solids basis.

B. Blend 32 grams of aspartame with 100 grams of thermally treated pectinic acid solution having 4.8% soluble solids obtained from the process described in detail in Example 9. The mixture is placed in a shallow pan and allowed to dry overnight in an air oven at 32° C. The dried blend then is pulverized to a fine powder to be used as a food sweetener composition. The final product being comprised of 13% treated pectinic acid and 87% aspartame on a dry solids basis.

Due to the intensity of the sweetness of aspartame, a food sweetener composition suitable for more commercial applications may be manufactured by diluting and therefore bulking the aforementioned food sweetener compositions with starches, dextrins, fibers such as cellulose or similar ingredients to improve the bulk density and serving size of the food sweetener composition.

EXAMPLE 2

Liquid Food Sweetener Composition
Gluconic acid (50% aqueous solution from Sigma Chemical Company, St. Louis Mo.), 0.6 gram, is blended with 99.4 grams of an aqueous solution containing 1 gram of aspartame. This liquid food sweetener composition may be used in food applications (See, e.g., Example 4). The final composition being comprised of 23% gluconic acid and 77% aspartame on a dry solids basis. This liquid food sweetener composition then is stored under refrigerated conditions.

Liquid food sweetener compositions for commercial applications are dependent upon concentration. For example, some consumers prefer using a few drops of sugar substitute or liquid sweetener to achieve the desired sweetness. Other consumers prefer using a teaspoon such as with honey or maple syrup. For this reason, it is understood that the liquid sweetener composition may be concentrated to any desired amount. Also, preservatives may be added to the liquid sweetener composition to alleviate the necessity of storing the composition under refrigerated conditions.

Use of Food Sweetener Compositions

EXAMPLE 3

Gelatin Food Product
One envelope of Knox brand Unflavored Gelatin, sufficient to gel 2 cups of liquid, is dry blended with 0.5 gram of the dry food sweetener composition described above in Example 1. Dried flavoring, such as lemon, also may be added. This blend then is repackaged as an aspartame sweetened flavored gelatin dessert mix.

The above mix then may be blended with ¼ cup of cold water and allowed to stand for two minutes. One and ¾ cups of boiling water is added and mixed at high speed in a Waring-type blender. The gelatin dessert is allowed to cool in a standard refrigerator for at least about 3 hours, or until sufficiently solidified.

Tasting of such a gelatin dessert reveals no lingering aftertaste normally associated with gelatin dessert containing aspartame.

EXAMPLE 4

Sweetener for Iced Tea
Commercially available, unsweetened instant ice tea is prepared according to manufacturer's instruction. Add about 10 cc of the liquid sweetener composition described in Example 2 to an 8 ounce glass of this ice tea. The treated tea may then be evaluated for lingering aftertaste commonly associated with instant teas sweetened with aspartame. There is no lingering aftertaste associated with the aspartame in the product of this Example.

III. Use of Sugar Acids in Food Compositions Containing Aspartame

The following examples represent food compositions containing aspartame to which a sugar acid is added. Different sugar acids may be used alone or in combination with food formulations containing aspartame. For example, a dried thermally treated pectinic acid and/or galacturonic may readily be blended into an instant gelatin dessert mix that contains aspartame as the sweetener. Alternatively, a syrup form of thermally treated pectinic acid syrup may be used in a flavor syrup of a diet beverage which is formulated with aspartame as the sweetener.

EXAMPLE 5

Use in Diet Beverages

Dried pectin syrup obtained from Example 9 was blended with the different diet beverages which contain aspartame. Table 5 below indicates the quantity of dried pectin syrup, per 100 cc of diet beverage, found to eradicate the lingering aftertaste o aspartame which these beverages normally exhibit.

TABLE 5

| QUANTITY OF DRIED PECTIN SYRUP FOUND TO ERADICATE LINGERING AFTERTASTE OF ASPARTAME | |
|---|---|
| Diet Beverage Containing Aspartame | % Dried Pectin Syrup to Eradicate Aftertaste |
| Diet Pepsi ™ | 0.07 |
| Diet Coke ™ | 0.05 |
| Diet Shasta ™ (lemon-lime) | 0.12 |
| 7-UP ™ | 0.06 |
| A & W Rootbeer ™ | 0.04 |
| Diet RC ™ Cola | 0.06 |
| Diet Slice ™ Mandarin-Orange | 0.06 |

It understood that the concentrations of treated pectinic acid found to eradicate the aftertaste of aspartame in the diet beverages above are subject to the discrimination of the taste panel. It is possible that other taste panels may prefer slightly more or less sugar acid.

EXAMPLE 6

Use of Treated Pectinic Acid in Starch Based Puddings Containing Aspartame

A starch based pudding containing aspartame having the following formulation below is prepared.

| Rice Starch | 35.0 gram |
|---|---|
| carrageenan | 1.5 gram |
| water | 457.0 gram |
| lemon flavoring | 6.5 gram |
| aspartame | 1.0 gram |

All ingredients with the exception of aspartame and the sugar acid are blended and then heated to 82° C. The pudding then is cooled to 50° C. and the aspartame added. The pudding is divided into two portions containing 250 grams each. To one portion, which contains a total of 0.5 gram aspartame, is added 0.15 gram of the dried treated pectinic acid of Example 9. Both portions again are mixed and allowed to cool under refrigerated conditions for about twenty-four hours. Both portions of the pudding are then evaluated for the presence of a lingering aftertaste. It was found that the pudding containing the treated pectinic acid does not have the lingering aftertaste normally associated with aspartame. The pudding portion without the sugar acid has the lingering aftertaste normally associated with aspartame.

EXAMPLE 7

Use of GA in a Gelatin Dessert Mix Formulation Containing Aspartame

Two packages of Sugar Free Jello™ Brand Gelatin Dessert containing Nutrasweet™ as the sweetener source, preferably flavored, are utilized for this example. To one package (9.5 grams) of the dry mix is added about 0.26 grams of GA (Sigma Chemical Co., St. Louis, Mo.). Both mixes are prepared according to directions on the gelatin dessert box.

A taste evaluation of both products reveals that the gelatin dessert containing the added sugar acid does not have the lingering aftertaste associated with aspartame. The sample without the sugar acid does have the distinct lingering aftertaste commonly associated with aspartame.

IV. Process for manufacturing Treated Pectinic Acid

EXAMPLE 8

Thermally Treated Pectinic Acid Mixture

A 5% aqueous pectin dispersion is prepared by weighing out about 50 grams of commercial PECTIN 1400 HM citrus pectin obtained from Grinstead, Industrial Airport, Kans., and briefly (approximately 30 seconds) blending the pectin with 450 grams of water in a high sheer mixer such as a Waring-type blender. The dispersion is transferred to a thermal-resistant glass container and heated at a temperature of about 105° C. for about 5.5 hours. At the end of the heat treatment period, the substance is allowed to cool to room temperature. The mixture, which includes a clear solution and a precipitate which readily separates and settles to the bottom of the container upon standing, has the following characteristics:

| Soluble Solids (by refractometer) | |
|---|---|
| HPIC | 4.8% |
| GA | 0.3% |
| DP2-20 | 3.9% |
| Taste | Pleasant acid (stronger than initial solution) |

Other characteristics are noted in TABLE 4, above.

EXAMPLE 9

Thermally Treated Pectinic Acid Solution

A 6.25% aqueous pectin dispersion was prepared by weighing out about 40 pounds of commercial PECTIN 1400 HM citrus pectin obtained from Grinstead, Industrial Airport, Kans., and blending it with about 600 pounds of water in a high sheer mixer such as a Breedo™ for 10 minutes. The dispersion then is heated via steam injection to 132° C. and held in a stainless steel pressure vessel for about 90 minutes. At the end of the heat treatment period, the treated mixture is removed from the tank and allowed to cool to 80° C. The mixture is subjected to ultrafiltration using a tangential flow type filter with a 1000 angstrom membrane. The clear solution has the following characteristics:

| Soluble Solids (by refractometer) | |
| --- | --- |
| HPIC | 4.8% |
| GA | 0.7% |
| DP2-20 | 11.6% |
| Taste | Pleasant acid (stronger than initial solution) |
| viscosity[9] | 16.0 cps |
| clarity | clear |

[9]Brookfield spindle #1, 20 rpm, 20° C.

The solution then may be concentrated by evaporation of the water to produce a treated pectinic acid syrup having a soluble solids of 25.6%.

Two 10 gallon portions of this syrup are subjected to further drying. Spray drying by conventional methods yields a light brown powder having a bulk density of about 0.35 gram/cc. Drum drying of the syrup by conventional drum drying methods results in a light brown powder that is 100% through a U.S. sieve, 14 mesh. The drum dried product has a bulk density of 0.14 gram/cc.

The above description is included to illustrate the operation of the preferred embodiments and is not meant to limit the scope of the invention. The scope of the invention is to be limited only by the following claims. From the above discussion, many variations will be apparent to one skilled in the art that would yet be encompassed by the spirit and scope of the invention.

What is claimed is:

1. A food sweetener composition, comprising:
   a sweetener system including aspartame; and
   a sugar acid in an amount sufficient to eradicate undesirable lingering aftertaste of the aspartame.

2. The composition of claim 1, wherein the sugar acid comprises a free C1 or C6 carboxylic acid group.

3. The composition of claim 1, wherein the sugar acid comprises at least one sugar acid from the group consisting of: aldonic; uronic; polyuronic; aldaric; partially esterified polyuronic; and, partially esterified aldaric acids.

4. The composition of claim 3, wherein the sugar acid is derived from the group of sugar acid sources consisting of: pectins; algins; polymers of polyuronic acids; polymers of partially esterified polyuronic acids; and acids resulting from oxidation of monosaccharides and their polymers.

5. The composition of claim 1, wherein the food sweetener composition is a liquid or syrup.

6. The composition of claim 1, wherein the food sweetener composition is a dried solid.

7. A food sweetener composition, comprising:
   sugar acids and aspartame such that the level of sugar acid is about 2 to about 120 percent that of the aspartame on a weight to weight solids basis.

8. The composition of claim 7, further comprising:
   gluconic acid at a level of about 30 percent that of aspartame, other monomeric sugar acids at a level of about 15 percent that of aspartame, and treated polyuronic acids including partially methoxylated polyuronic acids at a level of about 15 to about 55 percent that of aspartame;
   pectin at a level of about 100 to about 120 percent that of aspartame; alginic acid at a level of about 2 to 15 percent that of aspartame on a weight to weight solids basis.

9. The composition of claim 7, wherein the sugar acid comprises at least one sugar acid from the group consisting of: aldonic; uronic; polyuronic; aldaric; partially esterified polyuronic; and partially, esterified aldaric acids.

10. The composition of claim 9, wherein the sugar acid is derived from the group of sugar acid sources consisting of: pectins; algins; polymers of uronic acids; polymers of partially esterified uronic acids; acids derived from oxidation of monosaccharides and their polymers.

11. A food product composition, comprising a sweetener composition, said sweetener composition comprising:
    aspartame; and
    a sugar acid in an amount sufficient to eradicate undesirable lingering aftertaste of the aspartame.

12. The food product composition of claim 11, wherein the food product is one from the group of foods consisting of: beverages; puddings; gelatins; chewing gum; and, confectionery.

13. A food product composition, comprising:
    aspartame; and
    an exogenous source of sugar acid in an amount sufficient to eradicate lingering aftertaste of aspartame without contributing to viscosity.

14. The food product composition of claim 13, wherein the sugar acid comprises a free C1 or C6 carboxylic acid group.

15. The food product composition of claim 13, wherein the sugar acid comprises at least one sugar acid from the group consisting of: aldonic; uronic; polyuronic; aldaric; partially esterified polyuronic; and, partially esterified aldaric acids.

16. The food product composition of claim 15, wherein the sugar acid is derived from the group of sugar acid sources consisting of: pectin; algins; polymers of galacturonic acid; polymers of polyuronic acids; and acids resulting from oxidation of monosaccharides and their polymers.

17. The food product composition of claim 13, wherein the food product is one from the group of foods consisting of: beverages; puddings; gelatins; chewing gum; and, confectionery.

18. A carbonated beverage, comprising:
    aspartame; and
    a sugar acid from an exogenous source and in an amount sufficient to eradicate undesirable lingering aftertaste of the aspartame.

19. The carbonated beverage of claim 18, wherein the sugar acid comprises at least one sugar acid from the group consisting of: aldonic; uronic; polyuronic; aldaric; partially esterified polyuronic; and, partially esterified aldaric acids.

20. The carbonated beverage of claim 18, wherein the sugar acid is derived from the group of sugar acid sources consisting of: pectin; algins; polymers of galacturonic acid; polymers of polyuronic acids; and acids resulting from oxidation of monosaccharides and their polymers.

* * * * *